United States Patent
Banerjee et al.

(10) Patent No.: US 7,073,019 B2
(45) Date of Patent: Jul. 4, 2006

(54) METHOD AND APPARATUS FOR ASSEMBLING NON-ALIGNED PACKET FRAGMENTS OVER MULTIPLE CYCLES

(75) Inventors: Amitabha Banerjee, San Jose, CA (US); Somnath Paul, Fremont, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 461 days.

(21) Appl. No.: 10/317,874

(22) Filed: Dec. 11, 2002

(65) Prior Publication Data

US 2004/0117584 A1 Jun. 17, 2004

(51) Int. Cl.
G06F 12/00 (2006.01)

(52) U.S. Cl. .................... 711/109; 711/217; 711/219; 711/169

(58) Field of Classification Search ........... 711/109, 711/169, 217, 218, 219
See application file for complete search history.

(56) References Cited

U.S. PATENT DOCUMENTS

| | | | | |
|---|---|---|---|---|
| 4,920,483 A | * | 4/1990 | Pogue et al. | 711/219 |
| 5,291,586 A | * | 3/1994 | Jen et al. | 712/220 |
| 5,471,628 A | * | 11/1995 | Phillips et al. | 712/223 |
| 5,964,835 A | * | 10/1999 | Fowler et al. | 709/216 |
| 6,640,297 B1 | * | 10/2003 | Banning et al. | 712/238 |

OTHER PUBLICATIONS

Finney et al; "Using a Common Barrel Shifter for operand normalization, operand alignment and operand unpack & pack in floating point", IBM TDB vol. 29 No. 2 Jul. 1986.*
Eddie Kohler, Robert Morris, Benjie Chen, "Programming Language Optimizations For Modular Router Configurations" ACM SIGOPS Operating Systems Review, vol. 36, 30, 37, Issue, 5, 5, 10, Oct. 2002.*
Imrich Chlamtac et al, "Scalable WDM Access Network Architecture Based On Photonic Slot Routing" IEEE/ACM Transactions on Networking (TON), vol. 7, Issue 1, pp.: 1-9, Feb. 1999.*
Nilam Ruparelia, *Delivering Ethernet Over Sonet Using Virtual Concatenation*, CommsDesign, Feb. 25, 2002, 8 pages, www.commsdesign.com/story/OEG20020225S0078.
Louis E. Frenzel, *Programmable Framer Chip Improves OC-48 Efficiency*, Electronic Design, Apr. 16, 2001, 4 pages.
Michael Timothy Moore, *Filling the WAN-Communications-Line Card*, designfeature, Apr. 18, 2002, 5 pages, www.ednmag.com.

* cited by examiner

*Primary Examiner*—Pierre-Michel Bataille
(74) *Attorney, Agent, or Firm*—Blakely, Sokoloff, Taylor & Zafman LLP (57) ABSTRACT

A method and apparatus for assembling non-aligned packet fragments over multiple cycles is described. In one embodiment, the invention is a method. The method includes rotating a non-aligned data fragment within a rotate register based on a tail pointer of a prior data fragment to form a rotated data fragment. The method also includes outputting the rotated data fragment to a double width bus as a double width image of the rotated data fragment. The method further includes selectively copying the double width image of the rotated data fragment from the bus to a location logically following the prior data fragment in a destination register.

9 Claims, 8 Drawing Sheets

METHOD AND APPARATUS FOR ASSEMBLING NON-ALIGNED PACKET FRAGMENTS OVER MULTIPLE CYCLES

FIELD

The invention relates generally to circuits and methods of operating circuits, and more specifically to circuitry suitable for aligning non-aligned bits of a data packet for memory storage.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include reorganizing data from a series of packets into a format useful to a processor. In particular, this may include taking data bits of a series of bytes and reorganizing them into a form including only data bits. A similar problem may occur at a byte-level, wherein some bytes of a group of bytes are data bytes, and other bytes are effectively control bytes which need to be parsed out of data.

Figure 1A:
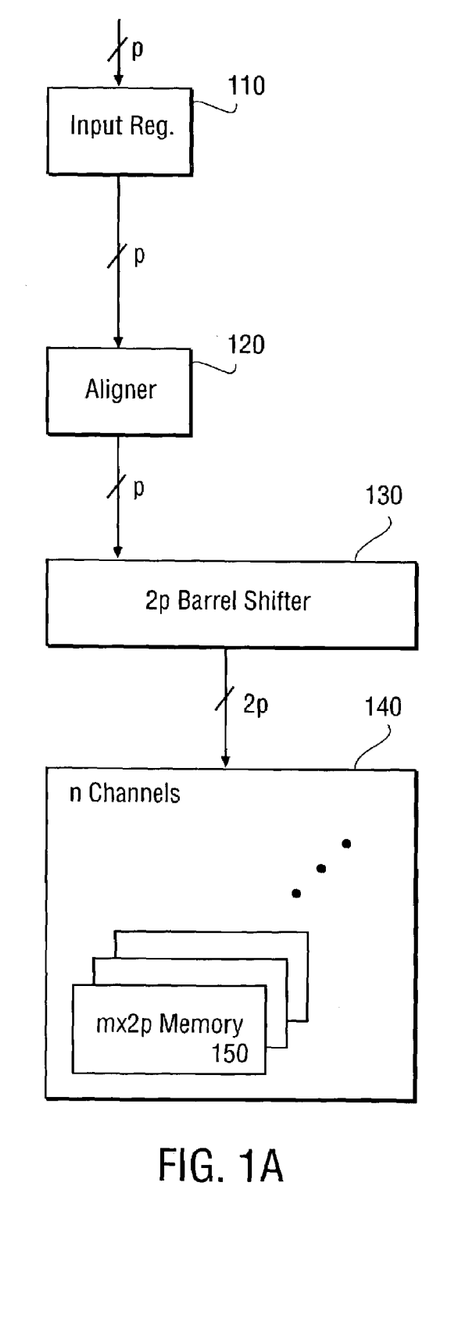
FIG. 1A illustrates in block diagram form an embodiment of a conventional circuit for aligning and storing portions of data.
Figure 1B:
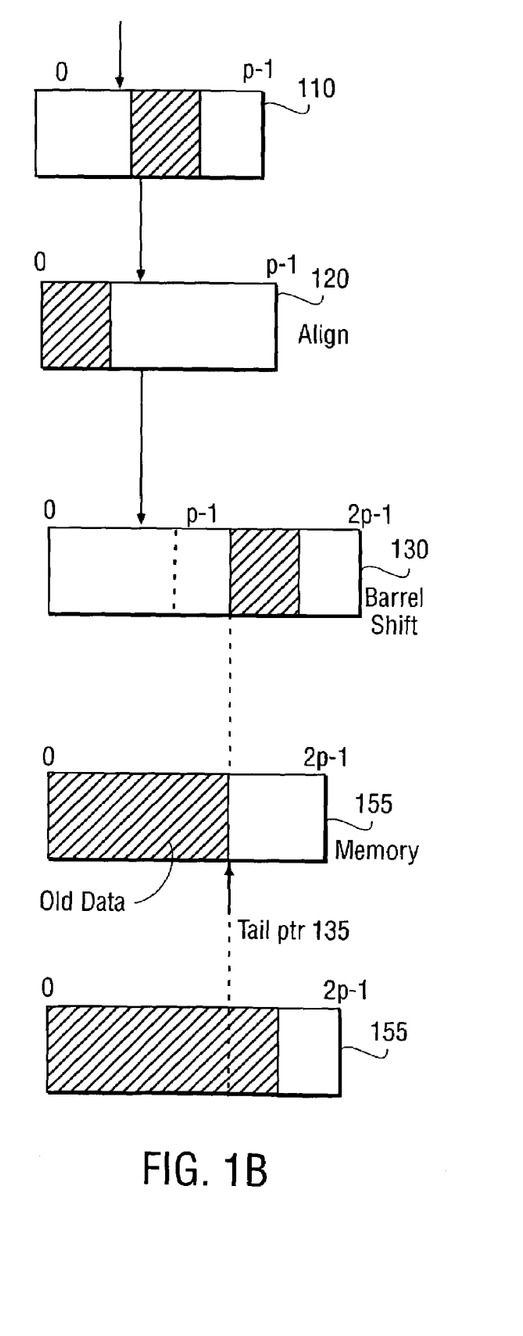
FIG. 1B illustrates in block diagram form operation of the embodiment of FIG. 1A.

FIG. 1A illustrates in block diagram form an embodiment of a conventional circuit for aligning and storing portions of data. FIG. 1B illustrates in block diagram form operation of the embodiment of FIG. 1A. This circuit may be used to align and properly store data parsed from a stream of data and control bits. Input register 110 receives data in an unpacked form, up to p bytes wide. Aligner 120 receives the data from input register 110, and lines the bits up at the beginning of the register. Based on data already in memory 150 of memory block 140, Barrel Shifter 130 shifts the bits from aligner 120 to a desired location. For example, if the old data already in memory storage location 155 takes up part of the storage location, a tail pointer 135 will point to the first bit available in memory storage location 155. Tail pointer 135 may be used by barrel shifter 130 to determine where to shift the data. The data may then be written to memory storage location 155 in a bit-wise fashion, such that memory storage location 155 contains both the old data and the new data received in input register 110. Note that memory block 140 is used to store data for n (more than 1) channels of data, and may be implemented such that it contains one memory 150 for each channel, for example.

Figure 1C:
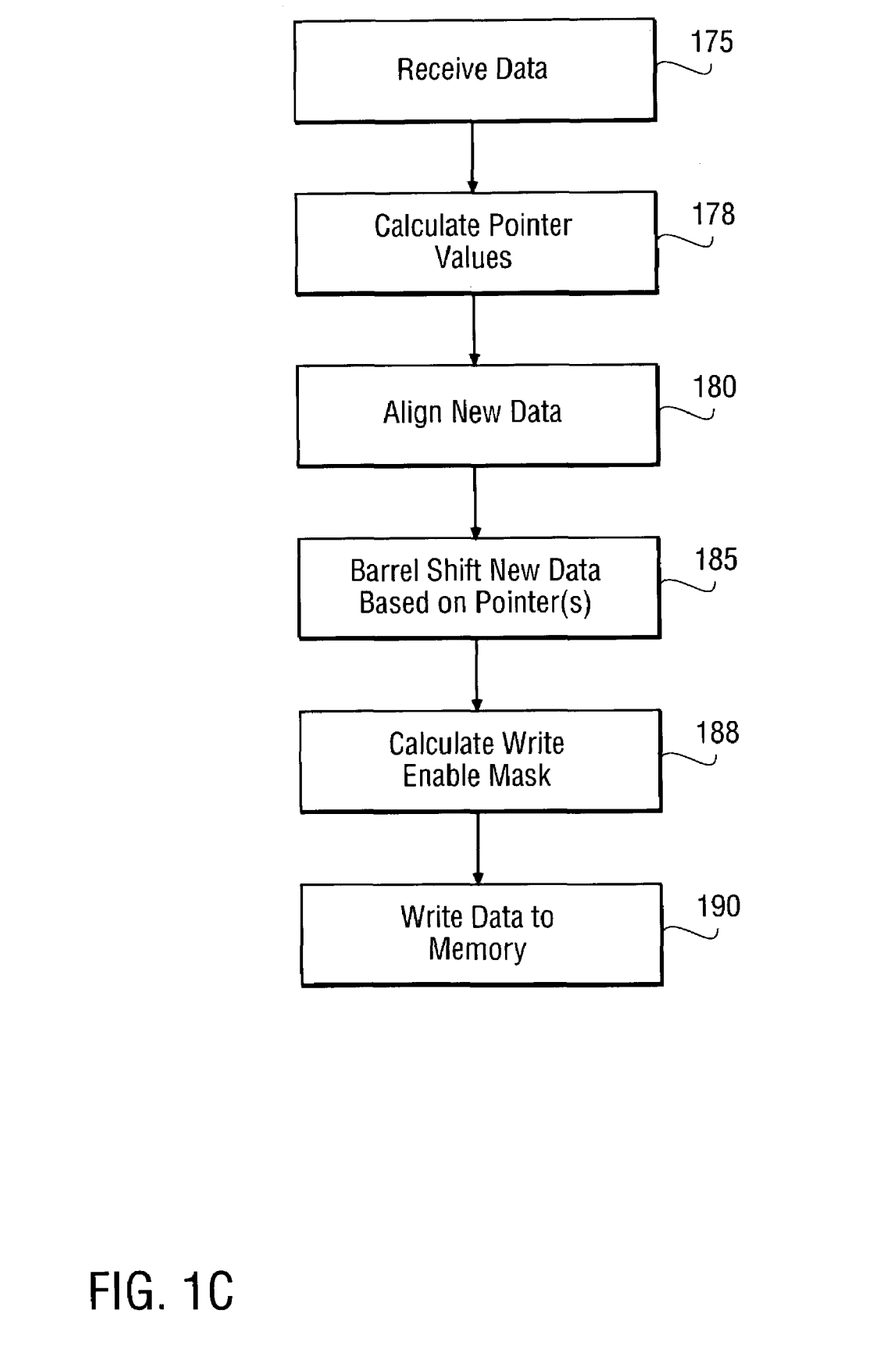
FIG. 1C illustrates in flow diagram form operation of the embodiment of FIG. 1A.

FIG. 1C illustrates in flow diagram form operation of the embodiment of FIG. 1A. At block 175, data is received in unpacked form, such as in input register 110. At block 178, pointer values, such as tail pointer 135, are calculated, determining where data is already stored in the appropriate memory storage location. At block 180, the new data received is aligned, such as in aligner 120. This alignment shifts the new data to the 0 bit of the aligner 120, and allows the barrel shifter 130 to operate on the data properly. At block 185, the new data is barrel shifted (such as in barrel shifter 130 for example), based on the tail pointer 135. At block 188, a write enable mask is calculated, such that only the new data of the barrel shifter 130 will be written. At block 190, using the write enable mask, data from barrel shifter 130 is written to a memory storage location such as memory storage location 155.

This approach suffers from requirements of increasing logic for increasing bus widths. Whereas a 4 bit barrel shifter may require n gates, an 8 bit barrel shifter may require 4n gates, and a 16 bit barrel shifter may require 16n gates for implementation. Thus, as bus widths grow, this approach requires exponential growth in logic.

SUMMARY OF THE INVENTION

A method and apparatus for assembling non-aligned packet fragments over multiple cycles is described. In one embodiment, the invention is a method. The method includes rotating a non-aligned data fragment within a rotate register based on a tail pointer of a prior data fragment to form a rotated data fragment. The method also includes outputting the rotated data fragment to a double width bus as a double width image of the rotated data fragment. The method further includes selectively copying the double width image of the rotated data fragment from the bus to a location logically following the prior data fragment in a destination register.

In an alternate embodiment, the invention is an apparatus. The apparatus includes a rotate register to receive a data fragment and logically rotate bits of the data fragment. The apparatus also includes a double width bus coupled to the rotate register to receive a double width image of the contents of the rotate register. The apparatus further includes a destination register coupled to the double width bus to receive data of the double width image from the double width bus.

In another alternate embodiment, the invention is also an apparatus. The apparatus includes a first means for storing a data fragment and rotating bits of the data fragment. The apparatus also includes a means for transferring a double width image of data stored in the first means for storing. The apparatus further includes a second means for storing data from the means for transferring. The second means is for receiving data selectively from the means for transferring.

BRIEF DESCRIPTION OF THE DRAWINGS

The present invention is illustrated by way of example and not limitation in the accompanying figures.

DETAILED DESCRIPTION

A method and apparatus for assembling non-aligned packet fragments over multiple cycles is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

As bandwidth expands, the size of datapaths tends to expand, sometimes in quantum leaps. For example, datapaths expand typically from 8 to 16 bits, without stopping at intermediary points such as 10 or 12 bits. When logic surrounding datapaths expands, it is preferable that the logic expands slowly, such as linearly or logarithmically with the expansion of the datapaths, and not exponentially. Otherwise, the logic controlling the datapaths may effectively prohibit expansion of the datapaths.

As illustrated in the following figures, various embodiments of this invention provide for a scalable circuit useful for aligning data from a packet in memory, without requiring exponential scaling of the control circuitry. Generally, the data is received, barrel shifted within a register of the same size as the datapath of the supplying network, and then duplicated for purposes of supplying data to a wider bandwidth memory system. The duplicated data may be written with a mask into the desired area of memory. Thus, as the bandwidth of the memory system increases, additional duplication may be used to properly position incoming data, rather than requiring increasingly more complex barrel shifters.

A method and apparatus for assembling non-aligned packet fragments over multiple cycles is described. In one embodiment, the invention is a method. The method includes rotating a non-aligned data fragment within a rotate register based on a tail pointer of a prior data fragment to form a rotated data fragment. The method also includes outputting the rotated data fragment to a double width bus as a double width image of the rotated data fragment. The method further includes selectively copying the double width image of the rotated data fragment from the bus to a location logically following the prior data fragment in a destination register.

In an alternate embodiment, the invention is an apparatus. The apparatus includes a rotate register to receive a data fragment and logically rotate bits of the data fragment. The apparatus also includes a double width bus coupled to the rotate register to receive a double width image of the contents of the rotate register. The apparatus further includes a destination register coupled to the double width bus to receive data of the double width image from the double width bus.

In another alternate embodiment, the invention is also an apparatus. The apparatus includes a first means for storing a data fragment and rotating bits of the data fragment. The apparatus also includes a means for trarisferring a double width image of data stored in the first means for storing. The apparatus further includes a second means for storing data from the means for transferring. The second means is for receiving data selectively from the means for transferring.

Figure 2A:
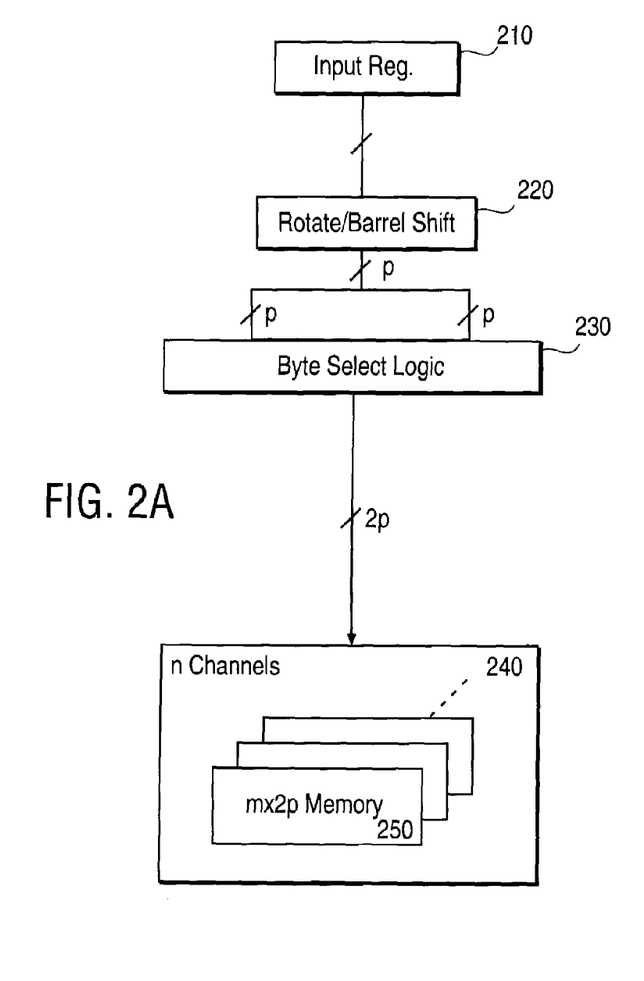
FIG. 2A illustrates in block diagram form an embodiment of a circuit for aligning and storing portions of data.
Figure 2B:
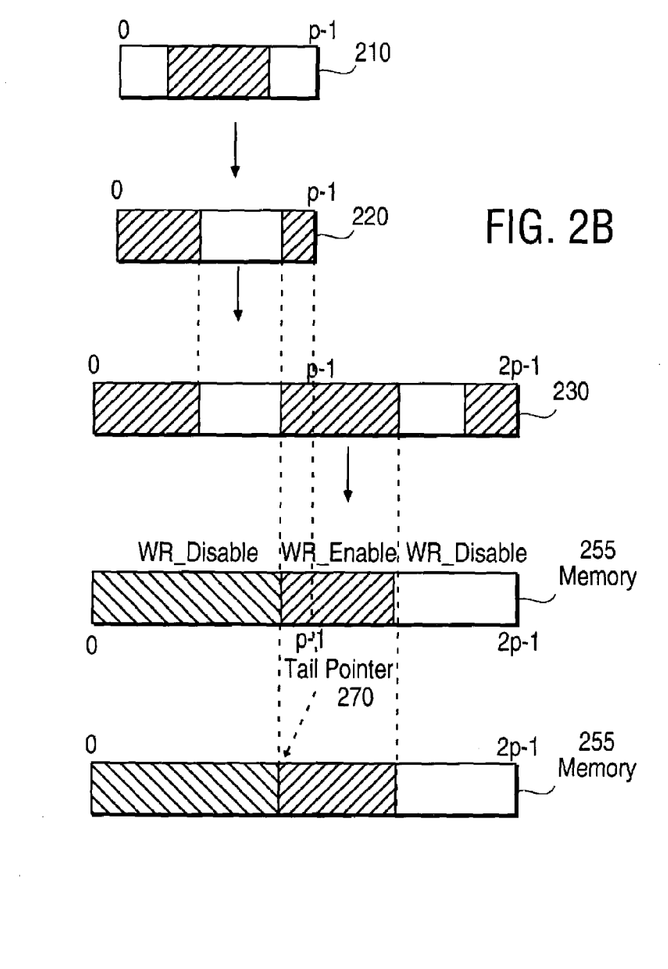
FIG. 2B illustrates in block diagram form operation of the embodiment of FIG. 2A.

FIG. 2A illustrates in block diagram form an embodiment of a circuit for aligning and storing portions of data. FIG. 2B illustrates in block diagram form operation of the embodiment of FIG. 2A. In summary, the embodiment illustrated receives unpacked data in an input register, shifts that unpacked data based on a tail pointer for a receiving memory storage location, copies the shifted data into a register multiple times to create a wrapped-around image of the shifted data, and then selectively copies the wrapped-around image of the shifted data to the receiving memory storage location.

Input register 210 receives data in unpacked form. In one embodiment, the data is a maximum of p bits, although in alternate embodiments, the data may be supplied in bytes rather than bits. The data is transferred to barrel shifter 220, which shifts the data to an appropriate position based on a tail pointer for memory 250 of memory block 240. In particular, tail pointer 270 points to the first bit in memory storage location 255 which follows the data previously stored in memory storage location 255. Barrel shifter 220 thus shifts the data to a point corresponding to the tail pointer location. If the tail pointer location is greater than the pth bit, a modulo p operation is performed to shift the data to a location corresponding to the tail pointer in the barrel shifter 220. The modulo p operation will be further described later in this document. Note that the barrel shifter 220 used in this context is restricted to p bits in width, regardless of the size of the downstream memory (memory block 240), thus standardizing and reducing the complexity of the barrel shifter 220 relative to the barrel shifter 130 of FIG. 1A.

Data from the barrel shifter 220 is then provided to byte select logic 230, with the data provided to the first p bits of byte select logic 230, and provided as an image to the next p bits of byte select logic 230, effectively creating a wrapped-around image of the data from barrel shifter 220. The data from byte select logic 230 is copied to memory storage location 255 using a write enable mask. This write enable mask allows for writing of the bits occupied by the data of byte select logic 230 without overwriting the old data already present in memory storage location 255. The extra illustration of memory storage location 255 at the bottom of FIG. 2B provides a clear indication of where tail pointer 270 points to during the operation, and what the contents of memory storage location 255 look like after the operation.

Figure 2C:
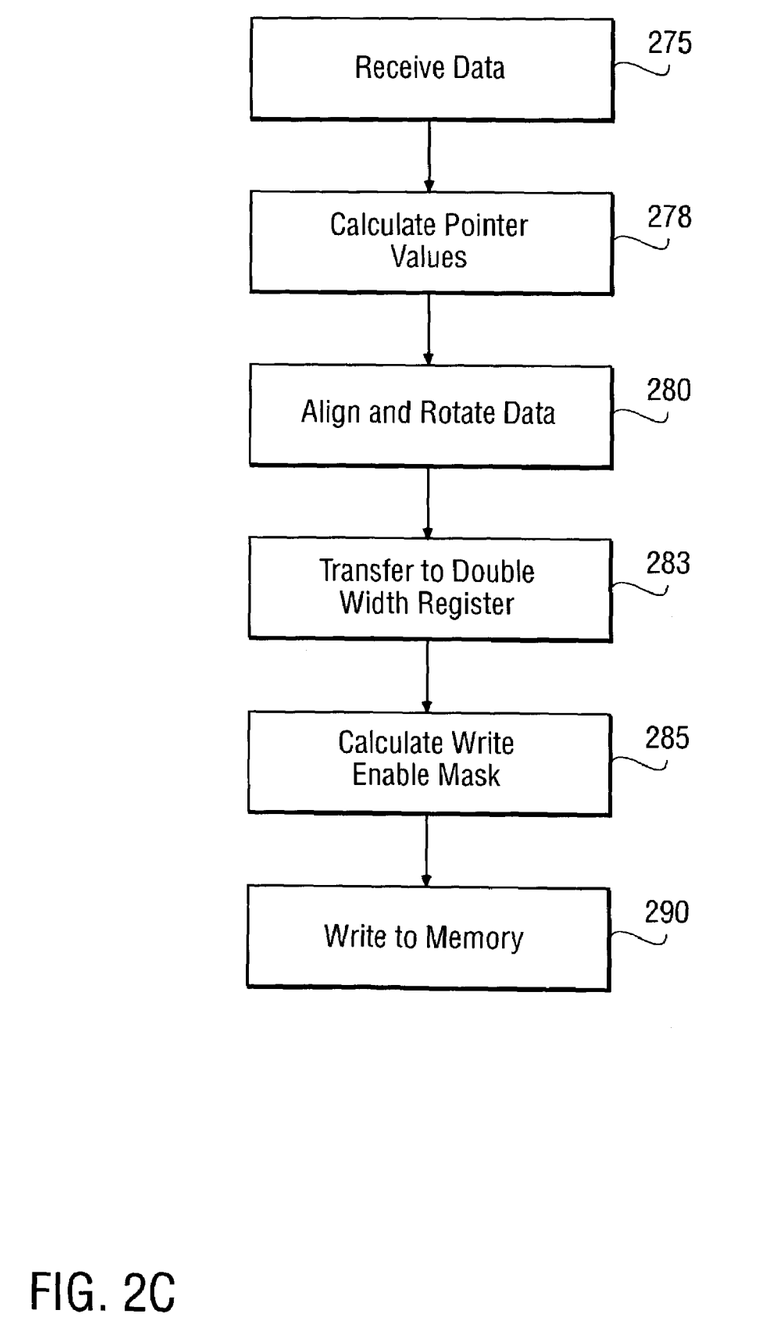
FIG. 2C illustrates in flow diagram form operation of the embodiment of FIG. 2A.

FIG. 2C illustrates in flow diagram form operation of the embodiment of FIG. 2A. The flow diagram illustrates a linear progression of a process, but the process may be performed in parallel rather than in serial fashion in some instances, or for some portions of the process. Similarly, the order of operations of the process may vary without exceeding the spirit and scope of the process.

At block 275, the data in unpacked form is received, such as in an input register. At block 278, a calculation is performed to determine how much data has been received, where previous data has been stored in memory (finding the tail pointer), and accordingly where data should be shifted. At block 280, the data is aligned and rotated or shifted. At block 283, the shifted data is transferred to a double width bus with images of the data provided side by side. At block 285, a write mask is calculated based on the size of the data and tail pointer calculated at block 278. At block 290, the data of the double width bus is selectively transferred to a receiving memory storage location using the write enable mask of block 278 to avoid overwriting previously stored data. Alternatively, an image register may be used to temporarily store the double width image of the data.

Figure 3A:
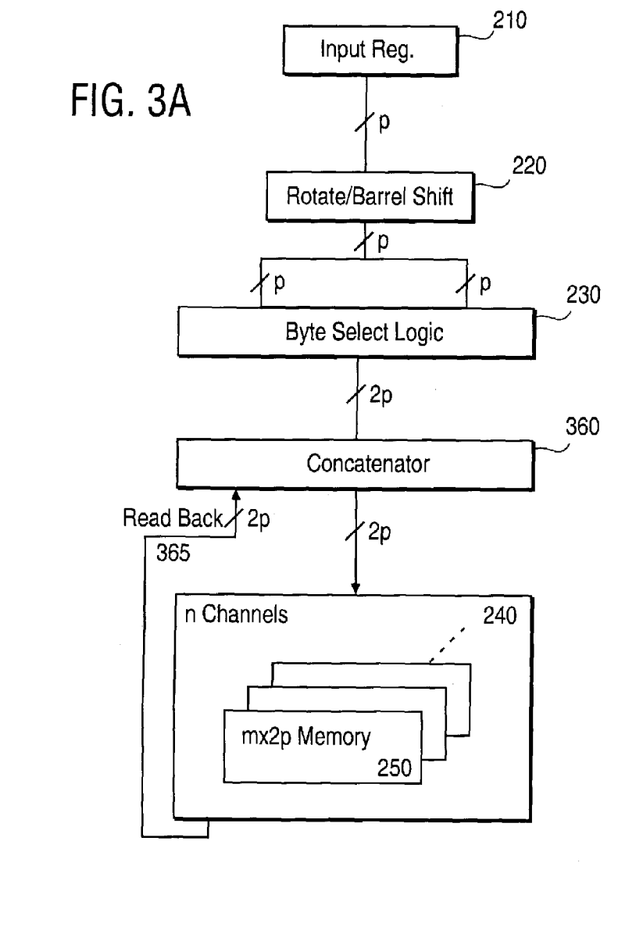
FIG. 3A illustrates in block diagram form an alternate embodiment of a circuit for aligning and storing portions of data.
Figure 3B:
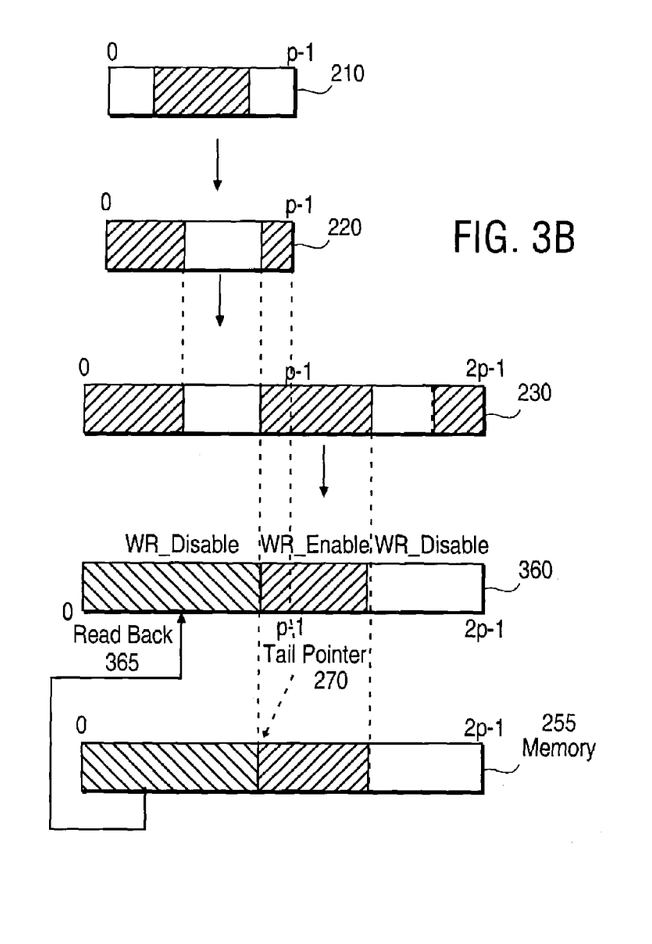
FIG. 3B illustrates in block diagram form operation of the embodiment of FIG. 3A.

FIG. 3A illustrates in block diagram form an alternate embodiment of a circuit for aligning and storing portions of data. FIG. 3B illustrates in block diagram form operation of the embodiment of FIG. 3A. In summary, the embodiment illustrated receives unpacked data in an input register, shifts that unpacked data based on a tail pointer for a receiving memory storage location, and outputs a double width image of the shifted data onto a double width bus to create a wrapped-around image of the shifted data. The embodiment then selectively copies the wrapped-around image of the shifted data from the bus along with data previously stored in the receiving memory location to an intermediate register, and then copies the contents of the intermediate register to the receiving memory storage location.

Input register 210 receives data in unpacked form. The data is transferred to barrel shifter 220, which shifts the data to an appropriate position based on a tail pointer for memory storage location 255 of memory block 240. In particular, tail pointer 270 points to the first bit in memory storage location 255 which follows the data previously stored in memory storage location 255. Barrel shifter 220 thus shifts the data to a point corresponding to the tail pointer location. If the tail pointer location is greater than the pth bit, a modulo p operation is performed to shift the data to a location corresponding to the tail pointer in the barrel shifter 220.

Data from the barrel shifter is then provided to byte select logic 230 through a double width bus, with the data provided to the first p bits of byte select logic 230, and provided as an image to the next p bits of byte select logic 230, effectively creating a wrapped-around image of the data from barrel shifter 220. The data from byte select logic 230 is copied to concatenator 360, along with previously stored data from memory storage location 255 using a write enable mask. This write enable mask allows for writing of the bits occupied by the data of byte select logic 230 in combination with the old data already present in memory storage location 255 to form an image of what will ultimately be written to memory storage location 255.

Figure 3C:
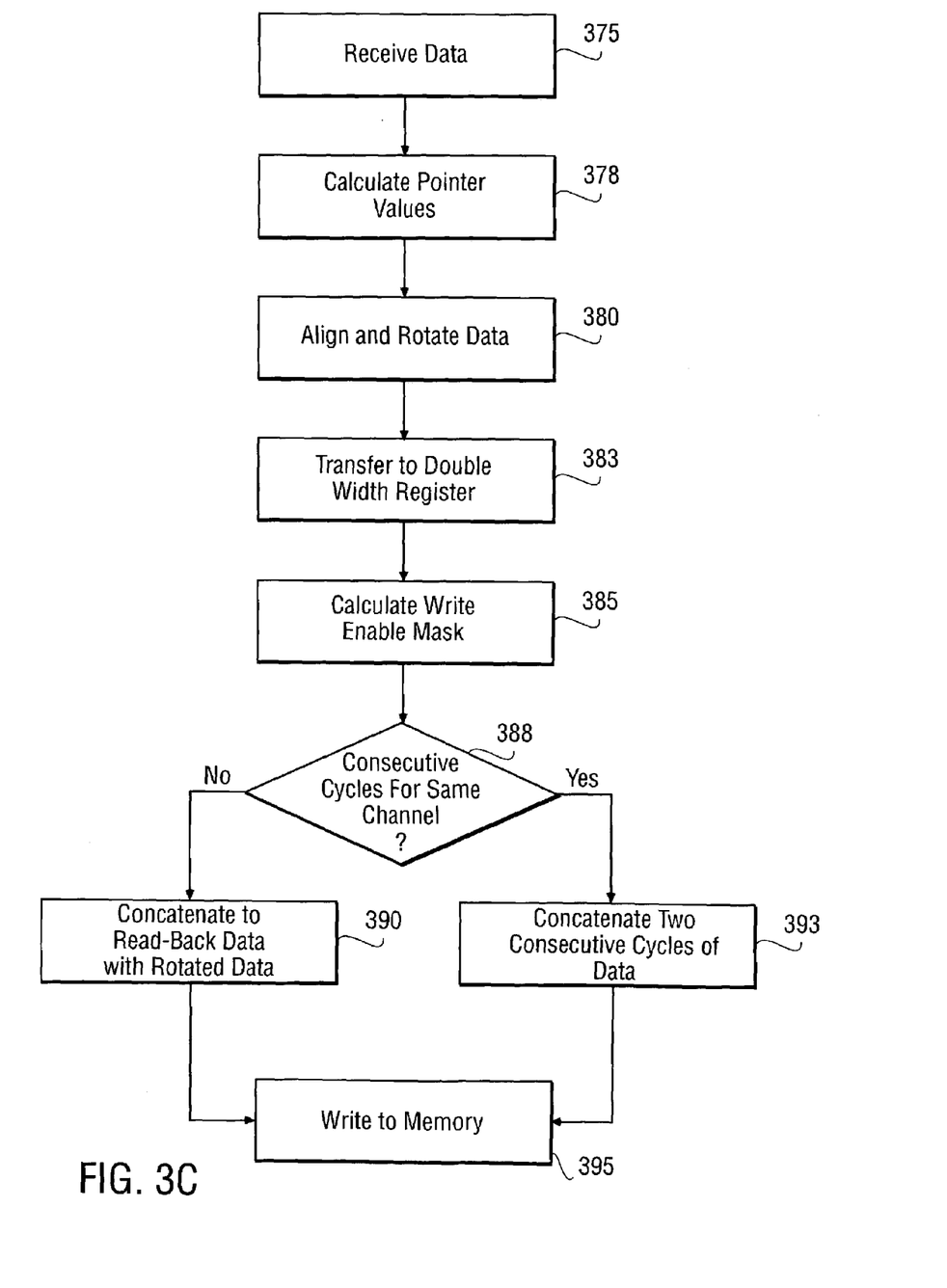
FIG. 3C illustrates in flow diagram form operation of the embodiment of FIG. 3A.

FIG. 3C illustrates in flow diagram form operation of the embodiment of FIG. 3A. In summary, the embodiment illustrated receives unpacked data in an input register, shifts that unpacked data based on a tail pointer for a receiving memory storage location, copies the shifted data into a concatenator multiple times to create a wrapped-around image of the shifted data, copies any previously stored data into the concatenator, and then copies the contents of the concatenator to the receiving memory storage location.

At block 375, the data in unpacked form is received, such as in an input register. At block 378, a calculation is performed to determine how much data has been received, where previous data has been stored in memory (finding the tail pointer), and accordingly where data should be shifted. At block 380, the data is aligned and rotated or shifted. At block 383, the shifted data is transferred to a double width bus, with images of the data provided side by side. At block 385, a write mask is calculated based on the size of the data and tail pointer calculated at block 378. At block 388, a determination is made as to whether data in consecutive cycles is directed to the same channel. If the data is directed to the same channel in both consecutive cycles, at block 393, the data of the two consecutive cycles is concatenated at block 393. If the data is not directed to the same channel in two consecutive cycles, at block 390, the data is concatenated with read-back data from the memory storage location which is to receive the data. In either situation, the process proceeds to block 395 and the concatenated data is written to memory.

Figure 4:
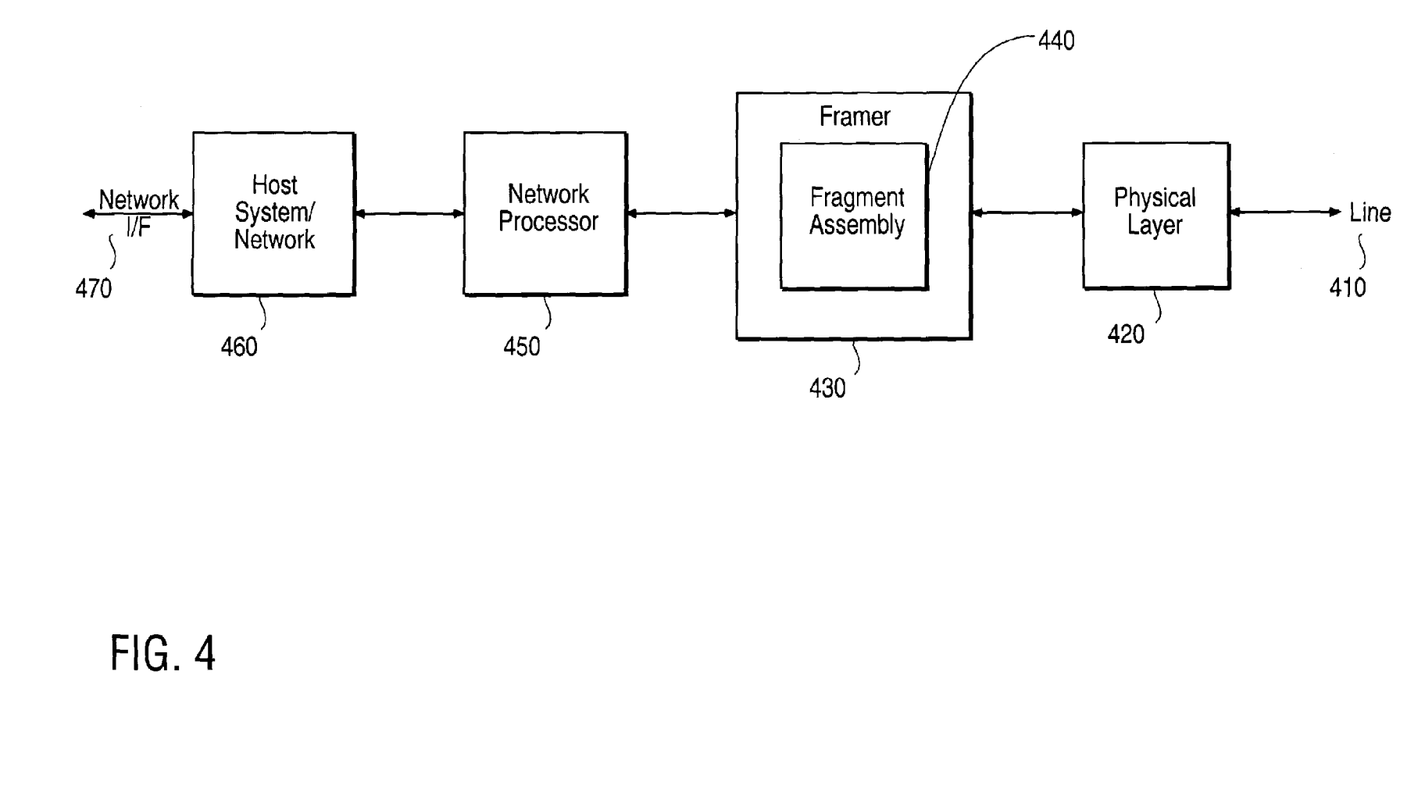
FIG. 4 illustrates a system which may contain an embodiment such as the embodiments of FIGS. 2A and 3A.

FIG. 4 illustrates a system which may contain an embodiment such as the embodiments of FIGS. 2A and 3A. Data is received and sent on line 410, which may be a fiber optic cable for example. Coupled to line 410 is physical layer 420, which translates signals from line 410 into a form suitable for use by circuitry, such as through optoelectronic transformation. Coupled to physical layer 420 is framer 430, which operates to frame or deframe data for transmission or reception, and includes fragment assembly component 440. Fragment assembly component 440 may be implemented using the embodiments described previously with respect to FIGS. 2A and 3A for example. Coupled to framer 430 is network processor 450, which may be used to process data for transmission or reception. Coupled to network processor 450 is host system 460, which may transfer data between network processor 450 and a network interface 470 which couples to an internal network.

Figure 5:
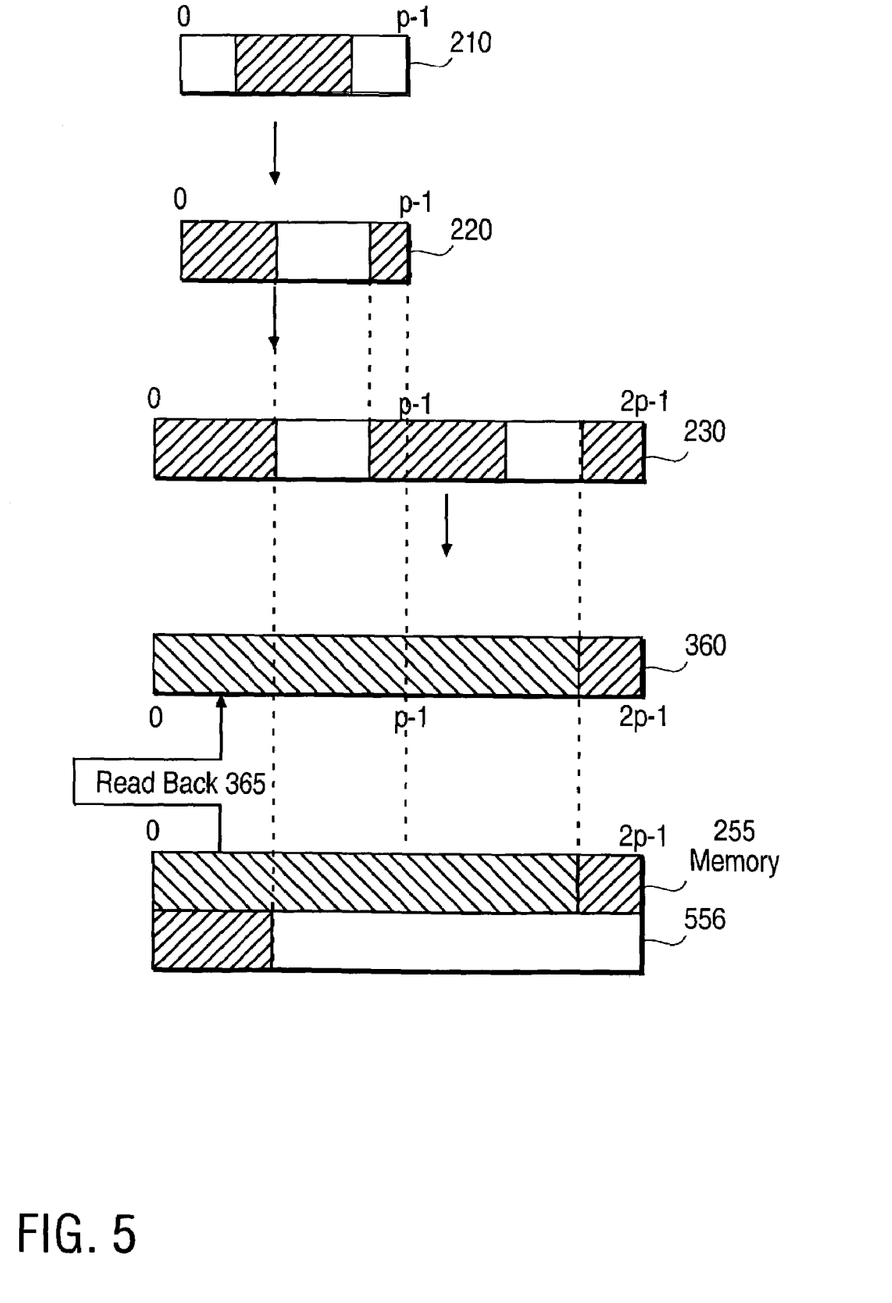
FIG. 5 illustrates in block diagram form operation of the embodiment of FIG. 3A under special circumstances.

FIG. 5 illustrates in block diagram form operation of the embodiment of FIG. 3A under special circumstances. Input register 210 receives data in unpacked form. The data is transferred to barrel shifter 220, which shifts the data to an appropriate position based on a tail pointer for memory storage location 255 of memory block 240. Tail pointer 270 points to the first bit in memory storage location 255 which follows the data previously stored in memory storage location 255. This bit, however, is in such a position that the data of input register 210 will overflow the end of memory storage location 255. Barrel shifter 220 shifts the data to a point corresponding to the tail pointer location. As the tail pointer location is greater than the pth bit, a modulo p operation is performed to shift the data to a location corresponding to the tail pointer in the barrel shifter 220. The modulo p operation determines the remainder of the tail pointer location when it is divided by p. As the data will be copied as an image multiple times (at least two), the tail pointer position is a relative position.

Data from the barrel shifter is then provided to byte select logic 230, with the data provided to the first p bits of byte select logic 230, and provided as an image to the next p bits of byte select logic 230, effectively creating a wrapped-around image of the data from barrel shifter 220. The data from byte select logic 230 is copied to concatenator 360, along with previously stored data from memory storage location 255 using a write enable mask. This write enable mask allows for writing of the bits occupied by the data of byte select logic 230 in combination with the old data already present in memory storage location 255 to form an image of what will ultimately be written to memory storage location 255.

As the data of byte select logic 230 overflows the memory storage location 255, only the bits between the tail pointer location and the end of byte select logic 230 is copied into the concatenator for copying into memory storage location 255. The remaining bits, occupying locations in byte select logic 230 starting with the 0th bit are copied into the concatenator after storage of data to memory storage location 255. These remaining data bits may either be stored to memory storage location 556 (the memory storage location logically following memory storage location 255) or may be retained in the concatenator until the next piece of data for the channel in question is received.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 2A or 3A may be integrated into components, or may be subdivided into components. Similarly, the blocks of FIG. 3C (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. An apparatus, comprising:
a rotate register to receive a data fragment and logically rotate bits of the data fragment;
a double width bus coupled to the rotate register to receive a double width image of the contents of the rotate register;
a destination register coupled to the double width bus to receive data of the double width image from the double width bus;
a write enable mask coupled to the destination register to selectively enable writing to the destination register, and
a concatenator coupled to the bus to receive the double width image and coupled to the destination register to provide contents of the concatenator to the destination register, wherein
the destination register is further coupled to the concatenator to selectively provide prior data to the concatenator.

2. The apparatus of claim 1, further comprising:
an initial data register coupled to the rotate register to provide data to the rotate register.

3. An apparatus, comprising:
a rotate register to receive a data fragment and logically rotate bits of the data fragment;
a double width bus coupled to the rotate register to receive a double width image of the contents of the rotate register;
a destination register coupled to the double width bus to receive data of the double width image from the double width bus, wherein each of the rotate register, the double width bus, and the destination register are included in a fragment assembly module, the fragment assembly module included in a framer, the framer suitable for coupling to a physical link layer and to a network processor.

4. The apparatus of claim 3, further comprising:
a physical link layer coupled to the framer; and
a network processor coupled to the framer.

5. The apparatus of claim 4, further comprising:
a physical network link coupled to the physical link layer;
a host system coupled to the network processor; and
a network interface coupled to the host system.

6. A method, comprising:
rotating a non-aligned data fragment within a rotate register based on a tail pointer of a prior data fragment to form a rotated data fragment;
outputting the rotated data fragment to a double width bus as a double width image of the rotated data fragment;
selectively copying the double width image of the rotated data fragment from the double width bus to a location logically following the prior data fragment in a destination register, wherein the tail pointer is a pointer to the first bit of the destination register logically following the bits occupied by the prior data fragment;
copying the prior data fragment into the rotate register; and
unpacking a received data fragment into the non-aligned data fragment.

7. The method of claim 6 wherein:
selective copying is implemented using a bitwise mask for the destination register, with bits of the prior data fragment masked from copying.

8. A method, comprising:
rotating a non-aligned data fragment within a rotate register based on a tail pointer of a prior data fragment to form a rotated data fragment;
outputting the rotated data fragment to a double width bus as a double width image of the rotated data fragment;
selectively copying the double width image of the rotated data fragment from the double width bus to a location logically following the prior data fragment in a destination register, wherein the tail pointer is a pointer to the first byte of the destination register logically following the bytes occupied by the prior data fragment;
copying the prior data fragment into the rotate register; and
unpacking a received data fragment into the non-aligned data fragment.

9. The method of claim 8 wherein:
selective copying is implemented using a bytewise mask for the destination register, with bytes of the prior data fragment masked from copying.

* * * * *